United States Patent
Ascari

(10) Patent No.: US 11,490,645 B2
(45) Date of Patent: Nov. 8, 2022

(54) MACHINE FOR REMOVING SEEDS

(71) Applicant: A.B.L. S.P.A., Cavezzo (IT)

(72) Inventor: Carlo Ascari, Cavezzo (IT)

(73) Assignee: A.B.L. S.R.L., Cavezzo (IT)

( * ) Notice: Subject to any disclaimer, the term of this patent is extended or adjusted under 35 U.S.C. 154(b) by 280 days.

(21) Appl. No.: 16/340,267

(22) PCT Filed: Nov. 6, 2017

(86) PCT No.: PCT/IB2017/056923
§ 371 (c)(1),
(2) Date: Apr. 8, 2019

(87) PCT Pub. No.: WO2018/087646
PCT Pub. Date: May 17, 2018

(65) Prior Publication Data
US 2019/0313686 A1    Oct. 17, 2019

(30) Foreign Application Priority Data
Nov. 8, 2016  (IT) .......................... 102016000112324

(51) Int. Cl.
*A23N 4/14*    (2006.01)

(52) U.S. Cl.
CPC ..................................... *A23N 4/14* (2013.01)

(58) Field of Classification Search
CPC ... A23N 4/14; A23N 4/00; A23N 3/00; A23N 7/00; A47J 17/00; B26D 3/26; B26D 2007/0043; B26D 7/0608; B26D 3/185
USPC ......... 99/542, 543, 545, 591, 547, 548, 549, 99/550, 551, 552, 553, 554, 555, 556, 99/557–566, 593; 426/484–485
See application file for complete search history.

(56) References Cited

U.S. PATENT DOCUMENTS

| | | | |
|---|---|---|---|
| 1,973,996 A * | 9/1934 | Reinstein | A23N 4/14 99/589 |
| 2,187,075 A | 1/1940 | Coons | |
| 2,210,909 A * | 8/1940 | Ewald | A23N 4/14 99/593 |
| 2,252,951 A * | 8/1941 | Urschel | A23N 4/16 99/642 |
| 3,162,225 A | 12/1964 | Loveland | |
| 3,246,676 A | 4/1966 | Anderson | |
| 3,246,678 A * | 4/1966 | Farmer | A23N 4/20 99/593 |
| 3,269,441 A | 8/1966 | Anderson | |
| 3,948,161 A | 4/1976 | Thorson | |
| 7,581,491 B2 * | 9/2009 | Ascari | A23N 4/20 99/489 |
| 9,277,765 B2 | 3/2016 | Hoffman et al. | |

(Continued)

FOREIGN PATENT DOCUMENTS

WO        2014039073 A1    3/2014

*Primary Examiner* — Tu B Hoang
*Assistant Examiner* — Yeong Juen Thong
(74) *Attorney, Agent, or Firm* — Pearne & Gordon LLP

(57) ABSTRACT

A machine for removing seeds, including:
a rotating rod (11) that is movable between a first position, in which it is found outside of a product (P), and a second position, in which it can be inserted in a product (P);
a curved knife (12) associated with the rotating rod (11);
an adjusting mechanism (20) structured so as to adjust the second position of the rotating rod (11) with respect to at least one dimension of the product (P) being processed.

6 Claims, 2 Drawing Sheets

(56) References Cited

U.S. PATENT DOCUMENTS

| | | |
|---|---|---|
| 9,521,861 B2 | 12/2016 | Hoffman et al. |
| 2004/0089166 A1* | 5/2004 | Ascari ...................... A23N 7/00 99/584 |
| 2005/0028686 A1* | 2/2005 | Ascari .................... A23N 7/026 99/584 |
| 2006/0021522 A1* | 2/2006 | Ascari ...................... A23N 7/08 99/584 |
| 2014/0065275 A1 | 3/2014 | Hoffman et al. |
| 2016/0113320 A1 | 4/2016 | Hoffman et al. |

* cited by examiner

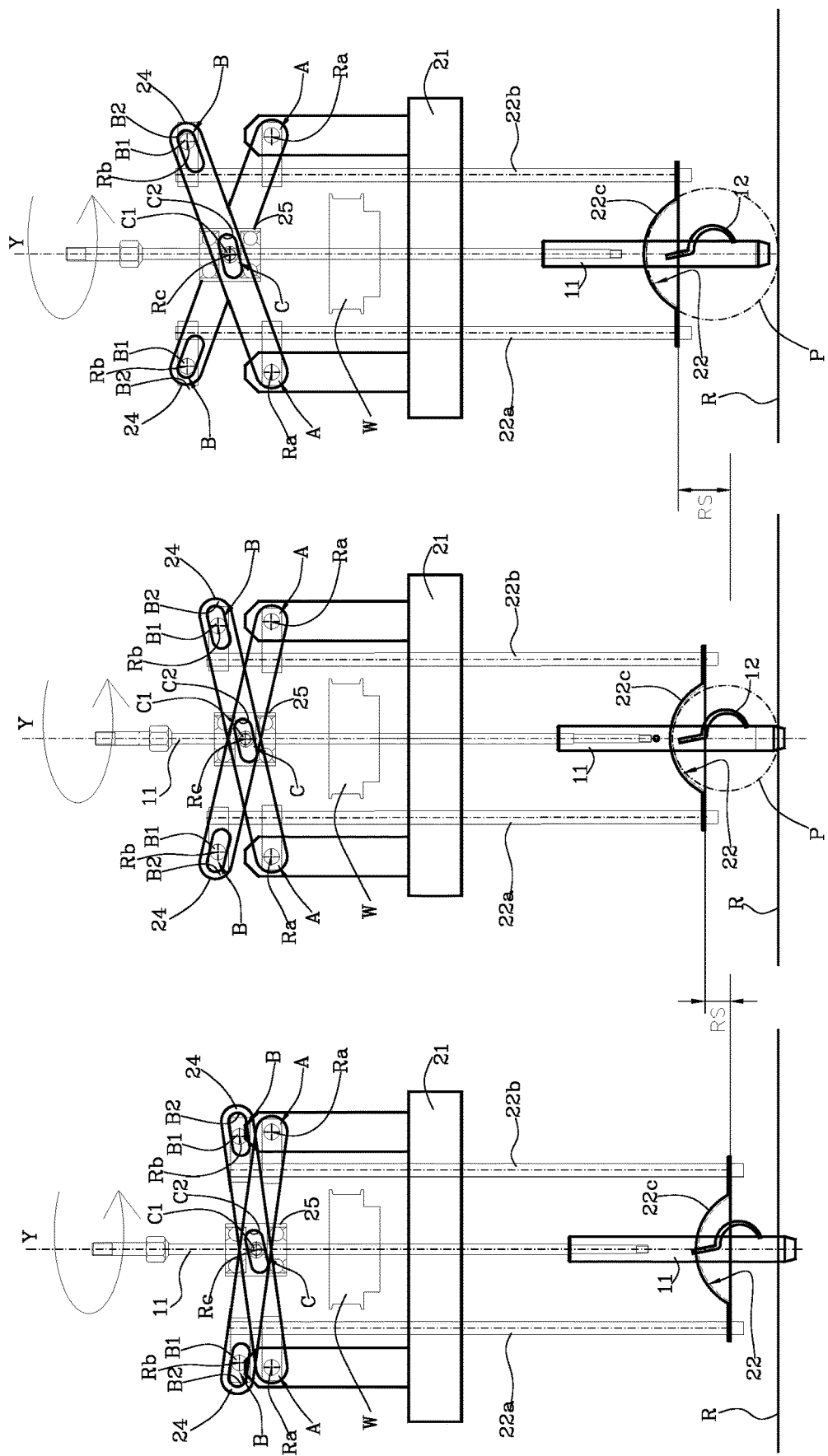

MACHINE FOR REMOVING SEEDS

FIELD OF THE INVENTION

The object of the present invention is a machine for removing seeds from a fruit or from a vegetable.

BACKGROUND OF THE INVENTION

The complete removal of the seeds generally found in the central part or core of the product is comprised in some fruit and vegetable processing lines.

A typical example of this type of processing is represented by production lines for apple wedges. This type of processing substantially comprises removing a cylindrical portion of the fruit which comprises the calyx, the pedicel and a good part of the core. Part of the seeds found outside of the removed cylindrical area remain in the fruit.

Machinery comprising a rod equipped with a curved knife is used to remove the seeds remaining in the fruit. The rod is inserted in the hollow space left free by the removal of the core, down to a position in which the curved knife is found approximately in the centre of the fruit. Once this position has been reached, the rod is activated so as to rotate. In this manner, the knife removes a spherical area of the fruit where substantially all the remaining seeds are found.

In currently available machines, adjustment of the stroke of the rod that positions the curved knife at the centre of the fruit cannot be carried out in real time, in relation to the dimensions of the single piece of fruit. In essence, the stroke of the rod is adjusted at the start of the production cycle in relation to fruits that must be substantially of the same dimensions. This means that in the case in which the fruits are not selected in advance in a manner that is quite meticulous, the removal of seeds does take place properly, for the curved knife could be positioned in an off-centred area of the fruit.

The aim of the invention is to offer a machine for removing seeds which makes it possible to overcome the drawbacks of currently available machines.

One advantage of the machine according to the invention is that it enables the curved knife to be positioned at the centre of the product, regardless of the dimensions of the product.

Another advantage of the machine according to the present invention is that the adjustment of the position of the curved knife takes place automatically for each single product.

BRIEF DESCRIPTION OF THE DRAWINGS

Further characteristics and advantages of the present invention will become more apparent in the following detailed description of an embodiment of the invention at hand which is illustrated by way of non-limiting example in the attached figures, of which:

FIG. 2 is a schematic view of the machine according to the present invention in a second operative configuration.

FIG. 3 is a schematic view of the machine according to the present invention in a third operative configuration.

FIG. 4 is a schematic view of the machine according to the present invention in a fourth operative configuration.

Figure 1:
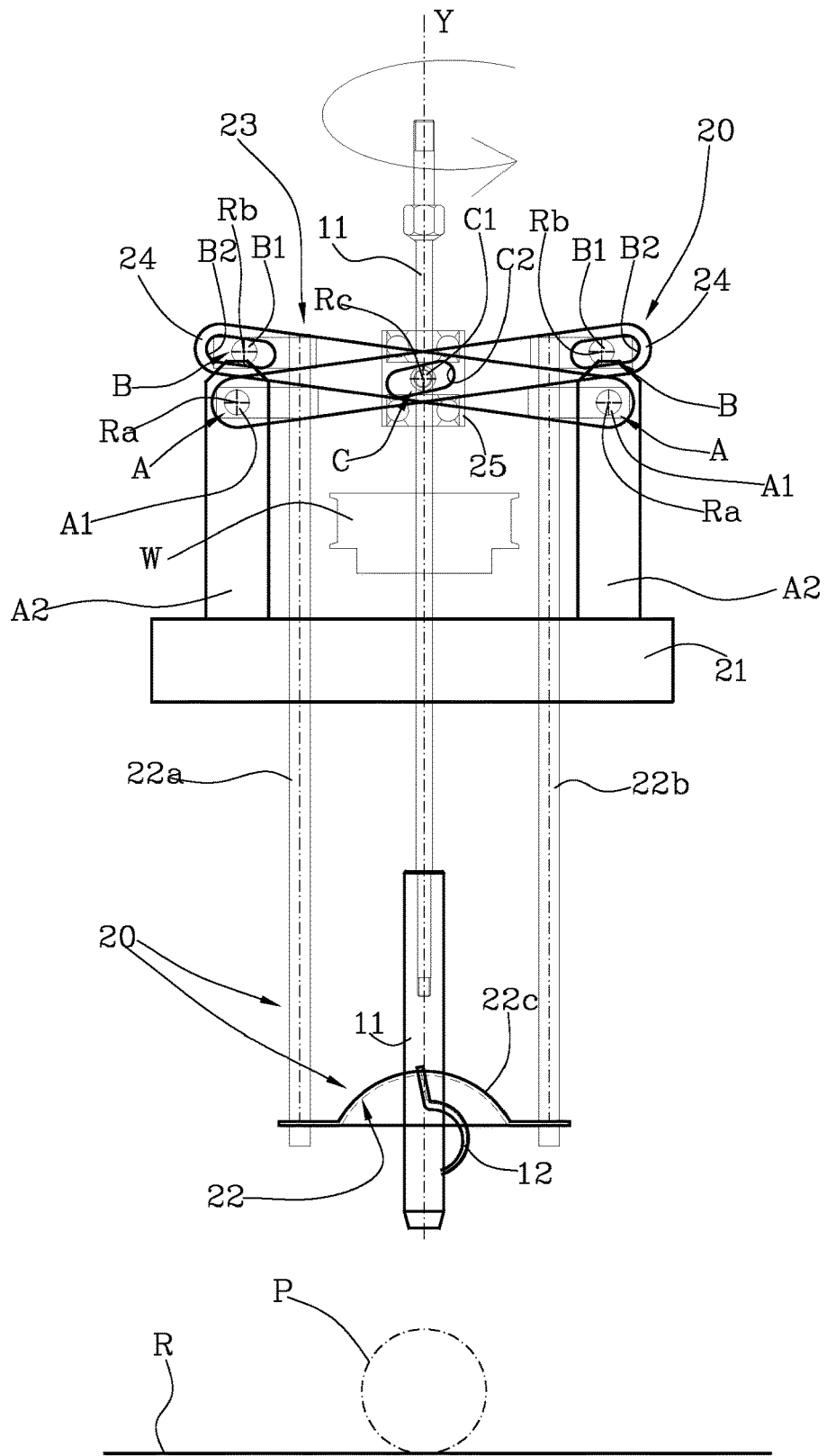
FIG. 1 is a schematic view of the machine according to the present invention in a first operative configuration.

DETAILED DESCRIPTION OF PREFERRED Embodiments of the Invention

The machine for removing seeds according to the present invention is suited to process products (P) in which a central portion that is substantially cylindrical in shape has already been removed and which thus have a central through hole. For example, the products (P) can be apples whose cores have been removed by means of a tubular knife. Two products (P) of different dimensions are schematically illustrated in FIGS. 2 and 3.

The machine comprises a rotating rod (11) with which a curved knife (12) is associated. The rotating rod (11) is movable between a first position, in which it is found outside of a product (P), and a second position, in which it can be inserted in a product (P). For example, the rotating rod (11) is movable along a vertical direction with respect to a rest surface (R) for the product (P). In this case, the first position is a raised position, with respect to the product (P), and in which the rod (11 is not in contact with the product (P), as shown in FIG. 1. The second position is a lowered position, in which the rod (11) nears the rest surface for the product (P) and arranges itself, at least for a portion thereof, inside the product (P). In this second position, the curved knife (12), which has been set into rotation by the rod (11), is capable of removing a spherical central area of the product (P). FIGS. 2, 3 and 4 show the rod (11) in the second position. In a manner known in the field, the curved knife (12) is movable with respect to the rotating rod (11) between an active position, in which it can operate on a product (P), removing a part thereof, and an inactive position, in which it cannot interact with the product (P). For example, in the inactive position the knife (12) is housed inside the rod (11), whereas in the active position it projects out of the rod (11).

The rest surface (R) for the product (P) is schematically shown in the form of a flat surface, in that it is a component that is known to the person skilled in the art. For example, the rest surface (R) could be in the form of a cup-shaped housing that is open towards the top and provided with an opening below that is arranged to receive at least one end portion of the rod (11).

The rod (11) rotates about an axial direction (Y), which, for example, coincides with a longitudinal axis of the rod (11). Rotation of the rod (11) can be obtained in various manners that are available to the person skilled in the art, for example by means of a pulley (W) rotationally integral with the rod (11) and that can be kinematically linked to a motor which is not illustrated. The coupling of the pulley (W) and the rotating rod (11) permits sliding of the rod (11) along the axial direction (Y).

Advantageously, the machine according to the present invention comprises an adjusting mechanism (20) structured so as to adjust the second position of the rotating rod (11) in relation to at least one dimension of the product (P) being processed. In particular, the adjusting mechanism (20) is structured so as to enter into contact with the product (P) and, in relation to a dimension of the product (P), so as to adjust the second position of the rotating rod (11) so that the curved knife (12) is found substantially at the centre of the product (P).

Owing to the adjusting mechanism (20), the machine according to the present invention is thus capable of arranging the curved knife (12) substantially at the centre of each product (P) being processed, even upon variation of the dimensions of the products (P) which are subsequently fed to the machine.

Preferably, the adjusting mechanism (20) is structured so as to adjust the length of the stroke of the rod (11) between the first and the second position, in relation to at least one dimension of the product (P) being processed.

In a preferred but not exclusive embodiment, the adjusting mechanism (20) comprises a main support (21) that is movable with respect to the rest surface (R) for the product (P), along a pre-established work stroke between an initial position, in which it is found at a greater distance from the rest surface (R), and a final position, in which it is found at a shorter distance from the rest surface (R). The rotating rod (11) is associated with this main support (21) in a slidable manner along the axial direction (Y), with the possibility of rotating about the axial direction (Y). Movement of the rotating rod (11) between its first and second position is substantially obtained by means of the work stroke of the main support (21). In the initial position of the main support (21), the rotating rod (11) is found in its first position, that is, it is found outside of the product (P). In the final position of the main support (21) (FIGS. 3 and 4), the rotating rod (11) is found in its second position, that is, it is found at least partially inside the product (P). The adjusting mechanism further comprises a feeler (22), which is arranged to come into contact with the product (P). The feeler (22) is movable with respect to the main support (21). In the preferred but not exclusive embodiment illustrated, the feeler (22) comprises a front plate (22c), which is designed to come into contact with the product (P), and with which one or more rods (22a, 22b) are associated. The rods (22a, 22b) are associated with the main support (21) slidably along the axial direction (Y).

In the course of the work stroke of the main support (21) from the initial position to the final position, the front plate (22c) comes into contact with the product (P) and stops, and the rods (22a, 22b) stop with it. The main support (21) instead continues its stroke until the end, sliding with respect to the rods (22a, 22b), which, as already indicated, remain stopped owing to the contact between the front plate (22c) and the product (P).

In essence, once the feeler (22) comes into contact with the product (P) and stops, a relative stroke (RS) is brought about between the main support (21) and the feeler (22), particularly between the main support (21) and the rods (22a, 22b). This relative stroke (RS) extends between an initial position, in which the feeler (22) projects for a greater distance from the main support (21) (FIG. 2) and a final position, in which the feeler (22) projects for a shorter distance from the main support (21) (FIGS. 3 and 4). The initial position of the feeler (22), shown in FIG. 2, is the position it assumes in the absence of a product (P), and it is the minimum distance at which it can be found from the rest surface (P) in the final position of the support (21). The stroke (RS) can be defined between the initial and final positions of the feeler (22), as shown in FIGS. 3 and 4.

The final position assumed by the feeler (22) with respect to the main support (21), that is, the length of the relative stroke (RS) between the feeler (22) and the main support (21), depends on the dimension of the product (P) as measured parallel to the axial direction (Y), and it is reached at the final position of the support (21), as shown in FIGS. 3 and 4.

A linkage mechanism (23) connects the feeler (22) to the rotating rod (11). This linkage mechanism (23) is structured to transmit to the rotating rod (11) a fraction or a multiple of the relative stroke (RS) between the main support (21) and the feeler (22). This means that while the stroke of the main support (21) is fixed, the stroke of the rotating rod (11) depends on the relative stroke (RS) that is determined between the main support (21) and the feeler (22), and thus on the dimension of the product (P). The linkage mechanism (23) comprises at least one oscillating bar (24) that has a first constraint (A), at which it is rotatable with respect to the main support (21). In essence, the oscillating bar is pivoted to the main support (A) at the first constraint (A), with the possibility of rotating about a first axis (Ra), for example, perpendicular with respect to the axial direction (Y). For example, the first constraint (A) comprises a pin (A1) that is solidly constrained to the main support (21) by means of an arm or bracket (A2). The oscillating bar (24) further comprises a second constraint (B), at which it is slidable with respect to the feeler (22) and can rotate about a second axis (Rb) parallel to the first axis (Ra). The second constraint (B) substantially comprises a slot (B1), which is aligned along a direction joining the axes of rotation (Ra, Rb) of the first and the second constraint, and a pin (B2) that can rotate and slide with respect to the slot. In the illustrated embodiment, the slot is arranged on the bar (24), whereas the pivot pin is solidly constrained to the feeler (22), particularly to the rod (22a). In any case, these positions can be inverted.

The bar (24) also comprises at third constraint (C), at which it is slidable with respect to the rotating rod (11) and can rotate about a third axis (Rc) parallel to the first and the second axis (Ra, Rb). The third constraint (C) substantially comprises a slot (C1), which is aligned along the direction joining the axes of rotation (Ra, Rb) of the first and the second constraint, and a pin (C2) that can rotate and slide with respect to the slot (C1). In the illustrated embodiment, the slot (01) is arranged on the bar (24), whereas the pivot pin (C2) is associated with the rod (11). In any case, these positions can be inverted.

In the illustrated embodiment, there are two bars (24) that intersect symmetrically with respect to the third constraint (C). The bar (24) or bars (24) are preferably arranged on the opposite end of the main support (21) with respect to the feeler (22).

The third constraint (C) is associated with an attachment element (25) that is solidly constrained to the rotating rod (11) with respect to the movement along the axial direction (Y) and that permits rotation of the rotating rod (11) about the axial direction (Y). In the illustrated embodiment, the pivot pin (C2) is associated with this attachment element (25).

The structure of the linkage mechanism (23) makes it possible to transmit to the rotating rod (11) a multiple or a fraction of the relative stroke (RS) between the main support (21) and the feeler (22) which depends on the ratio of the distance between the first constraint (A) and the second constraint (B) and the distance between the first constraint (A) and the third constraint (C). In fact, while the support (21) is performing its work stroke, the feeler (22) comes into contact with the product (P) and, owing to the presence of the linkage mechanism (23), it activates the rotating rod (11) to slide with respect to the support (21) in an opposite direction with respect to the stroke of the support (21).

In the illustrated embodiment, the third constraint (C) is in an intermediate position between the first and the second constraint (A, B). In particular, the third constraint (C) is equidistant from the first constraint (A) and the second constraint (B). This means that the linkage mechanism (23) transfers to the rotating rod (11) half of the relative stroke (RS) between the feeler (22) and the main support (21). In particular, the rotating rod (11) is activated to slide by the linkage mechanism (23) for a stroke equal to half of the relative stroke (RS) between the feeler (22) and the main support (21) in an opposite direction with respect to the sliding direction of the main support (21).

This means that if the position of the curved knife (12) on the rotating rod (11) is adjusted so that the knife (12) is equidistant from the feeler (22) and the rest surface (R) when the main support (21) is found in its final position, as shown in FIG. 2, it will always be equidistant from the feeler (22) and the rest surface (R). As already shown, this is because the rotating rod (11) is activated to slide in the opposite direction by the linkage mechanism (23) for a stroke equal to half of the relative stroke (RS) between the feeler (22) and the main support (21), as can be seen in FIGS. 3 and 4.

In this manner, the curved knife (12) can be positioned substantially at the centre of the product (P), that is, it can be arranged in an equidistant position between the rest surface (R) and the feeler (22), for any dimension of the product (P).

The invention claimed is:

1. A machine for removing one or more seeds, comprising:
   a rotating rod (11), that is movable between a first position, in which the rotating rod is found outside of a product (P), and a second position, in which the rotating rod is inserted in a product (P);
   a curved knife (12), associated with the rotating rod (11);
   an adjusting mechanism (20) structured so as to adjust the second position of the rotating rod (11) with respect to at least one dimension of the product (P) being processed;
   wherein the adjusting mechanism (20) is structured so as to adjust a length of a stroke of the rotating rod (11) between the first position and the second position, with respect to at least one dimension of the product (P) being processed;
   wherein the adjusting mechanism (20) comprises:
   a main support (21), that is movable with respect to a rest surface (R) of the product (P) for a pre-established work stroke between a main support initial position and a main support final position, with which the rotating rod (11) is associated slidably along an axial direction (Y);
   a feeler (22), arranged to come into contact with an exterior of the product (P) without being driven into the product (P) and that is movable with respect to the main support (21) for a relative stroke having a length between a feeler initial position and a feeler final position;
   a linkage mechanism (23), that connects the feeler (22) to the rotating rod (11);
   wherein the adjusting mechanism (20) adjusts the length of the stroke of the rotating rod (11) depending on, or as a function of, the length of the relative stroke of the feeler (22), and wherein the linkage mechanism (23) is structured to transmit to the rotating rod (11) a fraction or a multiple of the relative stroke between the feeler (22) and the main support (21);
   wherein the linkage mechanism (23) comprises at least one oscillating bar (24) that has:
   a first constraint (A), at which it is rotatable with respect to the main support (21) about a first axis (Ra);
   a second constraint (B), at which it is slidable with respect to the feeler (22) and can rotate about a second axis (Rb);
   a third constraint (C), at which it is slidable with respect to the rotating rod (11) and can rotate about a third axis (Rc);
   wherein the rotation axes (Ra, Rb, Rc) of the constraints (A, B, C) are parallel to each other.

2. The machine according to claim 1, wherein the third constraint (C) is in an intermediate position between the first constraint (A) and the second constraint (B).

3. The machine according to claim 1, wherein the third constraint (C) is associated with an attachment element (25) that is attached to the rotating rod (11) with respect to the movement along the axial direction (Y) and that permits rotation of the rotating rod (11) about an axis aligned with the axial direction (Y).

4. The machine according to claim 1, comprising two oscillating bars (24) intersecting symmetrically with respect to the third constraint (C).

5. The machine according to claim 1, wherein the curved knife (12) is movable with respect to the rotating rod (11) between an active position, in which it can operate on a product (P) removing a part thereof, and an inactive position, in which it cannot interact with the product (P).

6. The machine according to claim 1, wherein the feeler (22) comprises a front plate (22c) having a concave surface effectively shaped to contact the exterior of the product (P).

* * * * *